US007443819B2

(12) United States Patent
Hempel et al.

(10) Patent No.: US 7,443,819 B2
(45) Date of Patent: Oct. 28, 2008

(54) MANAGING SCRAMBLING CODES DURING SERVING RADIO NETWORK SUBSYSTEM RELOCATION

(75) Inventors: Thomas Hempel, Neumarkt (DE);
Mirko Schacht, Allersberg (DE);
Sudeep Palat, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 401 days.

(21) Appl. No.: 11/087,151

(22) Filed: Mar. 23, 2005

(65) Prior Publication Data

US 2006/0215625 A1 Sep. 28, 2006

(51) Int. Cl.
*H04Q 7/00* (2006.01)
(52) U.S. Cl. .................. 370/331; 370/342; 455/436
(58) Field of Classification Search ............... 370/328, 370/329, 331; 455/436–439, 442–443
See application file for complete search history.

(56) References Cited

U.S. PATENT DOCUMENTS

| 5,978,412 | A  | * | 11/1999 | Takai ..................... 375/145 |
| 6,389,138 | B1 |   | 5/2002  | Li et al. ................. 380/35  |
| 6,438,120 | B1 | * | 8/2002  | Gustavsson et al. ....... 370/335 |
| 6,724,813 | B1 | * | 4/2004  | Jamal et al. ............. 375/219 |
| 2002/0068547 | A1 | * | 6/2002 | Kim et al. ............... 455/410 |
| 2002/0160744 | A1 |   | 10/2002 | Choi et al. |
| 2005/0030958 | A1 |   | 2/2005  | Laiho et al. ............. 370/401 |

FOREIGN PATENT DOCUMENTS

EP 1626514 2/2006
WO WO 2004/105280 12/2004

OTHER PUBLICATIONS

European Search Report Dated Jun. 16, 2006 (Serial No. 06241053.2).
"Cold Code Generator Reference Design", Mar. 2003, Version 1.0, Altera Corporation.

* cited by examiner

*Primary Examiner*—Duc Nguyen
*Assistant Examiner*—David Wang

(57) ABSTRACT

The present invention provides a method and an apparatus for managing relocation of one or more scrambling codes in a spread spectrum wireless communications system. The method comprises detecting an indication for a serving radio network subsystem relocation that causes a user equipment to leave a first radio network controller and selectively transiting, through an intermediate transition, at least one scrambling code of the one or more scrambling codes associated with an uplink from the first radio network controller to a second radio network controller for the user equipment in response to the indication. The first radio network controller may maintain three pools of scrambling codes, namely, a first pool of one or more relocated scrambling codes (SCs), a second pool of one or more free scrambling codes and a third pool for each of one or more used scrambling codes. By avoiding an early reuse, an uplink scrambling code may be assigned to a particular UE because a target radio network controller, i.e., a new serving radio network controller may use the same scrambling code as long relocated user equipment maintains a current call. In this way, an uplink scrambling code defined for a serving radio network subsystem relocation procedure based on 3GPP standards may be consistent across disparate vendor solutions.

17 Claims, 5 Drawing Sheets

MANAGING SCRAMBLING CODES DURING SERVING RADIO NETWORK SUBSYSTEM RELOCATION

FIELD OF THE INVENTION

This invention relates generally to telecommunications, and more particularly, to wireless communications.

DESCRIPTION OF THE RELATED ART

Typical wireless communications systems or mobile telecommunication systems provide different types of services to users or subscribers of a number of user equipment (UE), such as wireless communication devices. The wireless communication devices may be mobile or fixed units and situated within a geographic region across one or more wireless networks. The users or subscribers of mobile units or user equipment may constantly move within (and outside) particular wireless networks. To this end, a wireless communications system, for instance, a spread spectrum wireless communications system, such as code division multiple access (CDMA) system may allow multiple users to transmit simultaneously within the same wideband radio channel, enabling a frequency re-use based on a spread spectrum technique.

In a spread spectrum wireless communications system, an information signal between a base station and a UE is multiplied by a spread spectrum signal. Often spread spectrum systems, such as code division multiple access (CDMA) systems, spread and/or scramble data in the information signal by multiplying the information signal with a spreading and/or scrambling code sequence (scrambling code sequence), such as a pseudo noise (PN) code which is a binary sequence that appears random but can be reproduced by the intended receiving station. When the scrambling code sequence has the same pulse rate as the information signal, the product of the scrambling code sequence and the information signal is scrambled, and the spectrum is unchanged.

When moving within a particular wireless networks, such as a digital cellular CDMA network, a handover of mobile communications occurs for a user equipment (UE) upon a user leaving an area of responsibility of a first cell, namely, into a new cell. At this point, a serving radio network controller (RNC) of a serving radio network subsystem (RNS) gets replaced by a target RNC, as a new access radio network controller for the UE. A serving radio network subsystem (SRNS) relocation procedure may replace an existing SRNS by a target RNS. Using radio network subsystems (RNSs), a radio network controller communicates with a core network (CN). The SRNS relocation is generally used if a serving RNC and a target RNC are connected by an interface referred to as Iur for interconnecting two RNCs within a UTRAN network (UMTS Radio Access Network) and the target RNC acts as a drift RNC (DRNC). After a new connection to the target RNC is established, e.g., using an interface called Iub that interconnects the RNC to a Node B, the Iur connection between the two radio network controllers is released and the drift RNC becomes the new serving RNC.

The 3rd Generation Partnership Project (3GPP) standard defines a serving radio network subsystem relocation procedure, which does not involve a change of any radio resources assigned for a corresponding UE procedure that uses signalling protocols based on 3GPP specifications including 3GPP TR 25.931, 3GPP TS 25.331, 3GPP TS 23.009, 3GPP TS 23.060, 3GPP TS 25.413, and 3GPP TS 25.423. That is, in this serving radio network subsystem relocation procedure the user equipment is not involved at all. Therefore, an uplink scrambling code defined for the serving radio network subsystem relocation procedure based on these 3GPP standards may not be consistent with disparate vendor solutions. Because an uplink scrambling code has to be unique for a particular UE and should be same for all of the radio links within an active set of the user equipment, the serving RNC becomes a responsible network entity for assigning the uplink scrambling code. After a serving radio network subsystem relocation, a former drift RNC which subsequently becomes the serving RNC takes over this responsibility.

However, the responsibility of assigning a new uplink scrambling code throughout the serving radio network subsystem relocation is not adequately defined in the 3GPP standards. That is, it is not clear, whether or not a new serving RNC is to assign a new uplink scrambling code throughout the serving radio network subsystem relocation and if the old serving RNC is to be made aware that the uplink scrambling code is not in use any more. Moreover, a possible loss of signaling messages from a specific user equipment to a radio network controller or vice versa may occur during serving radio network subsystem relocation.

One solution to scrambling code administration during the serving radio network subsystem relocation suggests use of a timer-based trigger for transiting scrambling codes from the relocated buffer. Such a solution runs a significant risk of causing a collision between UEs that may end up using the same scrambling code, especially in an inter-vendor scenario where the two involved radio network controllers concerned may follow different policies for treating the scrambling codes. With such a timer-based solution, a risk of causing a collision is relatively high, as the particular scrambling code may become available upon a timer expiry regardless of the availability of other scrambling codes.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for managing relocation of one or more scrambling codes in a spread spectrum wireless communications system. The method comprises detecting an indication for a serving radio network subsystem relocation that causes a user equipment to leave a first radio network controller and selectively transiting, through an intermediate transition, at least one scrambling code of the one or more scrambling codes associated with an uplink from the first radio network controller to a second radio network controller for the user equipment in response to the indication.

In another embodiment, a radio network controller is associated with a wireless network in a spread spectrum wireless communications system. The radio network controller comprises a controller and a storage coupled thereto. The storage may store instructions to detect an indication for a serving radio network subsystem relocation that causes a user equipment to leave the radio network controller and to selectively transit, through an intermediate transition, at least one scrambling code of the one or more scrambling codes associated with an uplink from the radio network controller to a second radio network controller for the user equipment in response to the indication.

In yet another embodiment, a spread spectrum wireless communications system comprises a radio network controller associated with a wireless network. The radio network controller is similar to one described in an embodiment set forth above.

In still another embodiment, an article comprising a computer readable storage medium storing instructions that, when executed cause a spread spectrum wireless communications system to detect an indication for a serving radio network subsystem relocation that causes a user equipment to leave a first radio network controller and to selectively transit, through an intermediate transition, at least one scrambling code of the one or more scrambling codes associated with an uplink from the first radio network controller to a second radio network controller for the user equipment in response to the indication.

In one exemplary embodiment, an apparatus for managing relocation of one or more scrambling codes in a spread spectrum wireless communications system comprises means for detecting an indication for a serving radio network subsystem relocation that causes a user equipment to leave a first radio network controller and means for selectively transiting, through an intermediate transition, at least one scrambling code of the one or more scrambling codes associated with an uplink from the first radio network controller to a second radio network controller for the user equipment in response to the indication.

BRIEF DESCRIPTION OF THE DRAWINGS

The invention may be understood by reference to the following description taken in conjunction with the accompanying drawings, in which like reference numerals identify like elements, and in which.

Figure 1:
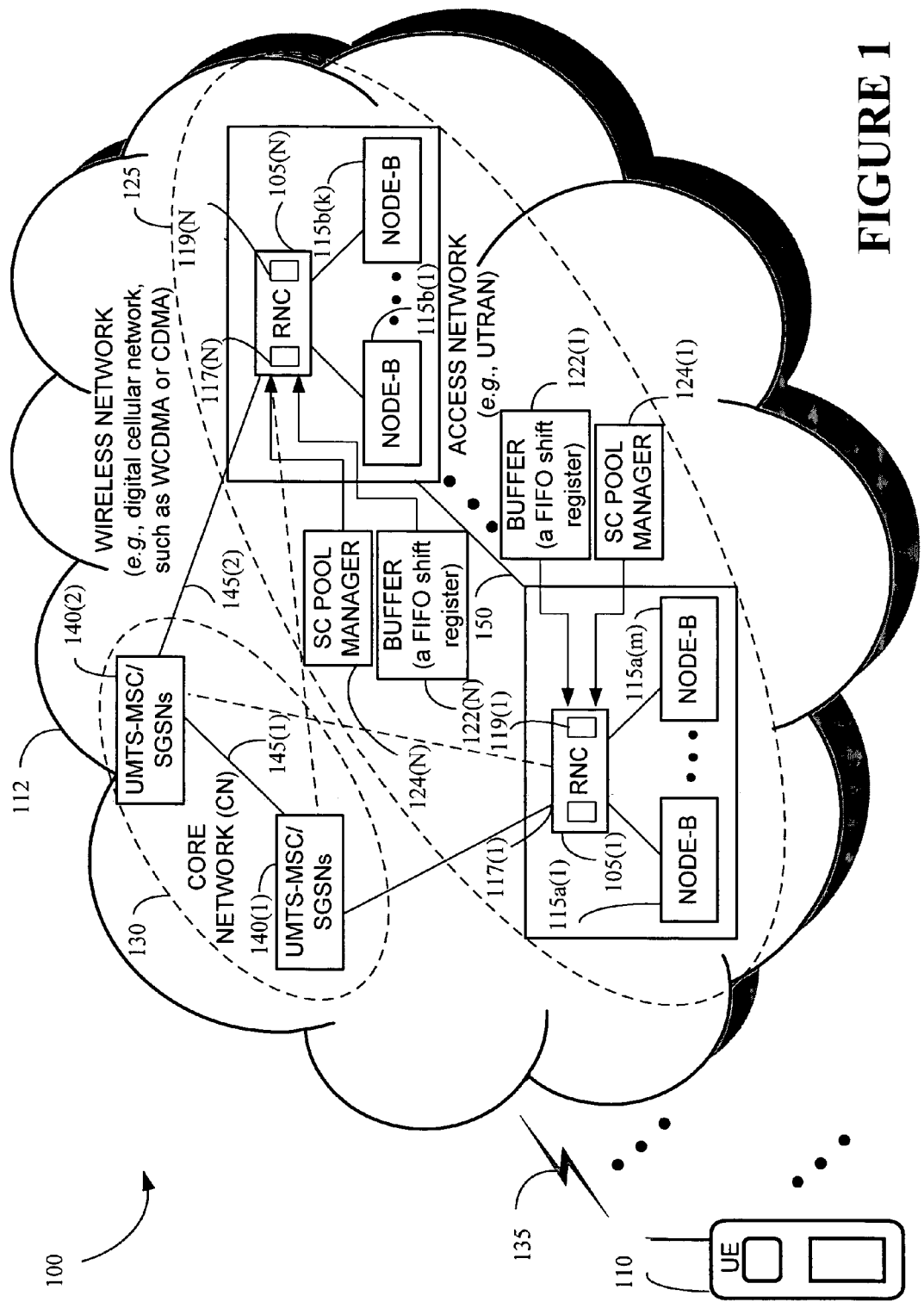
FIG. 1 illustrates a spread spectrum wireless communications system including a first and a second radio network controllers each associated with at least one base station within a wireless network to manage relocation of one or more scrambling codes for communicating with a user equipment according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and apparatus is described for managing one or more uplink scrambling codes during SRNS relocation. Such a method and apparatus may be 3GPP standard compliant and consistent with various vendor solutions. By detecting an indication for a serving radio network subsystem (SRNS) relocation that causes a user equipment to leave a first radio network controller, scrambling code pool manager may enable selective transiting, through an intermediate transition, of a particular scrambling code for the UE associated with an uplink from the first radio network controller to the second radio network controller in response o the indication for the SRNS relocation. In this way, an uplink (UL) scrambling code may be assigned to a particular UE. A first RNC may maintain three pools of scrambling codes, namely a first pool of one or more relocated scrambling codes (SCs), a second pool of one or more free scrambling codes and a third pool for each of one or more used scrambling codes. The scrambling code may be taken from a third pool of free scrambling codes if this pool is not empty. If the third pool of free scrambling codes is empty, an UL SC from a FIFO queue of the relocated UL SC pool may be taken. In both cases, however, a particular SC may be moved to a third pool of the used scrambling codes. In some embodiments, a network vendor may deploy a first manager to implement an assignment scheme of scrambling codes, which have been relocated to from one RNC to other RNCs, where early reuse may cause collisions. The first manager may account for a case where the UE takes a scrambling code to another RNC by the SRNS relocation.

Referring to FIG. 1, a spread spectrum wireless communications system 100 is illustrated to include a first and a second radio network controller 105(1), 105(N) that manage relocation of one or more scrambling codes for communicating with a user equipment (UE) 110 according to one illustrative embodiment of the present invention. Each of the first and second radio network controllers 105(1), 105(N) may be associated with one or more base stations, e.g., Node-Bs within a wireless network 112. Specifically, the first radio network controller 105(1) may be coupled to a first plurality of base stations, i.e., Node-Bs 115a (1-m) and the second radio network controller 105(M) may be coupled to a second plurality of base stations, i.e., Node-Bs 115b (1-k).

One example of the wireless network 112 includes a digital cellular network. More specifically, the 3rd Generation Partnership Project (3GPP) specifications for a wideband code division multiple access (WCDMA) Universal Mobile Telecommunications Systems (UMTS) defines a uplink channel that uses a set of specific sequences in spread spectrum systems, such as a based on a CDMA technique. The user equipment (UE) 110 may refer to a host of wireless communication devices including, but not limited to, cellular telephones, personal digital assistants (PDAs), and global positioning systems (GPS) that employ the spread spectrum communications system 100 to operate in the wireless network 112, such as a digital cellular CDMA network.

Each of the first and the second radio network controller 105(1-N) may comprise a controller and a storage coupled to that controller. In particular, the first radio network controller 105(1) may include a first controller 117(1) and a first storage 119(1). Likewise, the second radio network controller 105(N) may include a second controller 117(N) and a second storage 119(N). Furthermore, the first radio network controller 105(1) may include a first buffer 122(1) e.g., a first-in-first-out (FIFO) shift register to selectively transit, through an intermediate transition, at least one scrambling code (SC) of the one or more scrambling codes and a first manager 124(1), e.g., a SC pool manager to manage relocation of the one or more scrambling codes. Likewise, the second radio network controller 105(N) may include a second buffer 122(N) and a second manager 124(N).

For example, the first storage 119(1) may store instructions to detect an indication for a serving radio network subsystem (SRNS) relocation that causes the user equipment 110 to leave the first radio network controller 105(1). The instructions may enable the first manager 124(1) to use the first buffer 122(1) for selectively transiting, through an intermediate transition, a particular scrambling code for the UE 110 associated with an uplink from the first radio network controller 105(1) to the second radio network controller 105(N) in response to the indication for the SRNS relocation.

An uplink or a reverse communication link refers to a means for transmitting information from the UE 110 to a base station, i.e., the Node-B 115a(1), for example, over a radio frequency (RF) link that transports data from the UE 110 to the base station in an uplink as a portion of a communications link. That is, a RF uplink or a RF reverse link may indicate the transmission of RF signals. Example of a RF uplink or a RF reverse link includes a base station controller (BSC) to a mobile services switching center (MSC) or from a base transceiver station (BTS) to a BSC.

In one embodiment, the SRNS relocation may be performed for a given wireless communication device, e.g., the UE 110 in the wireless network 112, such as a Universal Mobile Telecommunications System (UMTS) network. The wireless network 112 may comprise a radio access network 125, e.g., a Universal Terrestrial Radio Access Network (UTRAN) and a core network (CN) 130, in which the radio access network and the core network 130 may be logically separated.

The core network 130 may process voice calls using UMTS mobile services switching centers (UMTS-MSCs) or may use a data network such as a General Packet Radio Service (GPRS) network including serving GPRS support nodes (SGSNs) 140(1) and 140(2). The UE 110 may couple to the core network 130 via the radio access network 125 referred to as a UTRAN. More particularly, the UMTS-MSCs/SGSNs 140(1) and 140(2) may connect to the first and second radio network controllers 105(1-N) over a conventional interface generally referred to as Iu interfaces 145(1-2).

However, the SRNS relocation may be responsible for a transfer of radio resources between a serving RNC, i.e., the first RNC 105(1) and a target RNC, i.e., the second RNC 105(N) in the wireless network 112, such as a UMTS network. More specifically, the SRNS relocation will move the control of a UE wireless connection over an air interface from a source, for example, the old serving RNC 105(1) to a target or new serving RNC 105(N). Accordingly, both a control and a user plane may be moved to the target or new serving RNC 105(N). In this way, the SRNS relocation may handle and relocate the UE 110 and RNC serving role.

A user plane connection may be established between the target RNC 105(N) and the CN 130. In some embodiments, the user plane connection may extend between the target RNC 105(N), referred to as a drift RNC and the core network 130 via the serving RNC 105(1). An interface, i.e., an Iur interface 150 may be established between the drift RNC 105(N) and the serving RNC 105(1). The wireless network 112 may subsequently convert the drift RNC into a new serving RNC, establishing a direct user plane connection to the CN 130.

The CN 130 may comprise an automatic request (ARQ) unit for retransmission to handle a potential data loss. Essentially, the ARQ unit enables a link for communications in which a receiver requests a transmitter to resend a block of data when errors may be detected in transmission. During the SRNS relocation, for the control plane, i.e., involving signaling between the UE 110 and the serving RNC 105(1), the target RNC 105(N) may become a serving RNC, providing a signaling link between the UE 110 and the serving RNC 105(1).

In operation, the serving RNC 105(1) may wirelessly communicate with the UE 110 to provide service data units (SDUs) from the CN 130 to the UE 110. The serving RNC 105(1) may associate a sequence number (SN) with each of the service data units, and the UE 110 may be capable of confirming to the serving RNC service data units received from the serving RNC 105(1). Forwarding information may be provided by the serving RNC 105(1) to the target RNC 105(N). The forwarding information may include service data units unconfirmed as received by the UE 110. In this manner, the target RNC 105(N) may be designated as the new serving RNC for the UE 110.

A bearer structure may be used by the radio access network 125, e.g., the UTRAN to carry user data between the UE 110 and the core network 130. To establish a user plane connection, the UMTS-MSC/SGSN 140(1) may communicate with the radio access network 125 to form a conventional logical connection, such as a Radio Access Bearer (RAB), between the UMTS-MSC/SGSN 140(1) and the UE 110. Using the RAB, the first RNC 105(1) may establish a user plane connection, e.g., an Iu bearer connection, with the core network 130 and a Radio Bearer (RB) Uu connection for the UE 110 based on logical channels.

Figure 2:
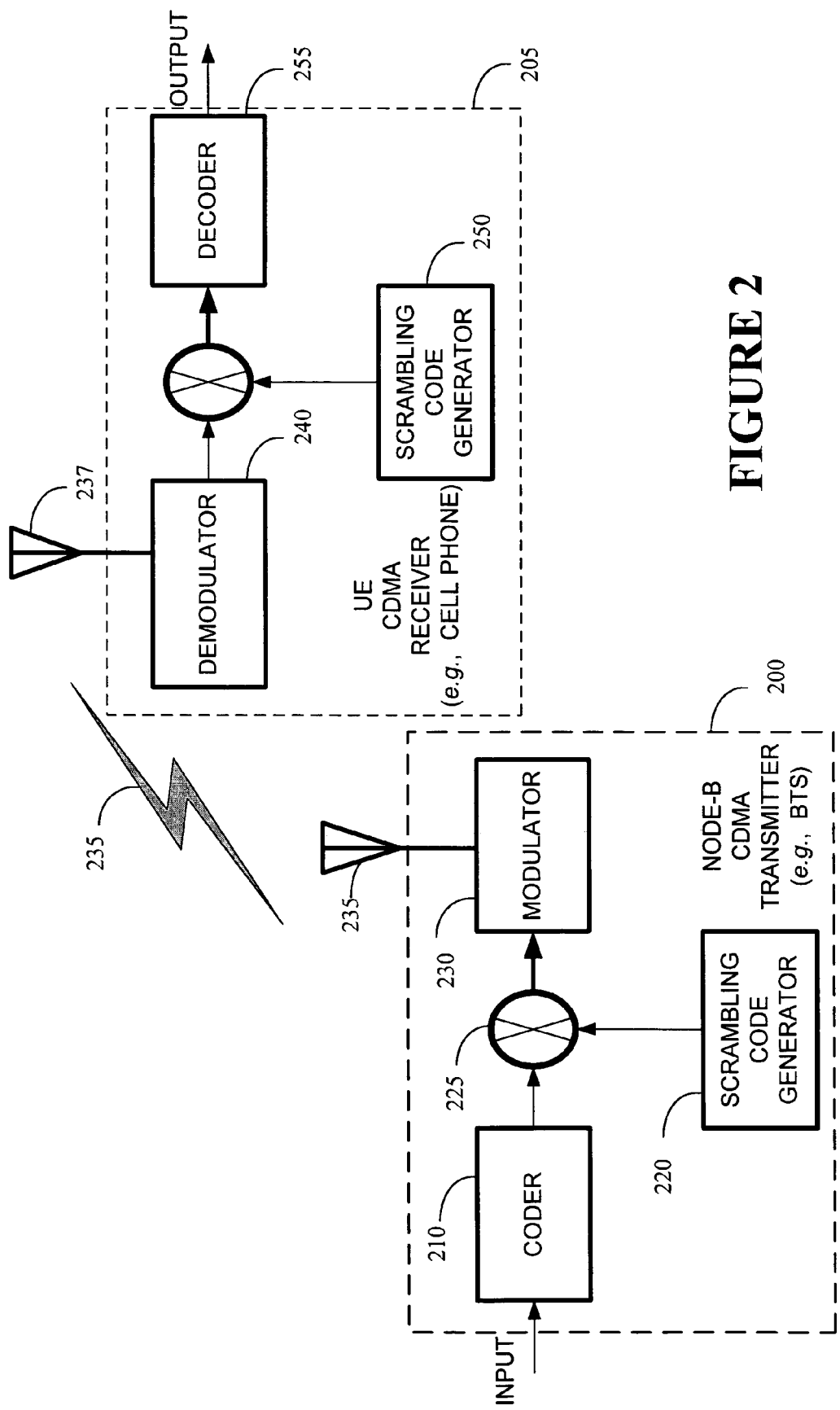
FIG. 2 schematically depicts a radio frequency transmitter and receiver based on a code division multiple access protocol for the base station and the user equipment illustrated in FIG. 1 in accordance with an exemplary embodiment of the instant invention.

Turning now to FIG. 2, a radio frequency (RF) transmitter 200 and a RF receiver 205 are schematically depicted based on a CDMA protocol for a base station, e.g., the Node-B 115a(1) and the user equipment 110 illustrated in FIG. 1 in accordance with an exemplary embodiment of the instant invention. While the transmitter 200 spreads and/or scrambles the information or data signal to produce a spread spectrum signal for transmission, and the receiver 205 descrambles and/or despreads the spread spectrum signal to retrieve original information or data.

To this end, in one embodiment, the transmitter 200 incorporates a coder 210 for processing original data being input, using channel coding, a bit-level interleaving, a digital modulation functions, or the alike to produce a RF communication signal 215. The transmitter 200 further comprises a scrambling code generator 220 that generates one or more scrambling codes, and a multiplier 225 for multiplying the scrambling codes with the output of the coder 210 to produce a wideband or a spread spectrum communication signal. The transmitter 200 may include a modulator 230 to modulate the spread spectrum communication signal onto a carrier signal and an antenna 235 to transmit the spread spectrum signal to the receiver 205.

The receiver 205 may comprise an antenna 237 to receive the spread spectrum signal from the transmitter 200 and a demodulator 240 to demodulate the received spread spectrum signal and generate a demodulated spread spectrum signal. The receiver 205 may further comprise a multiplier 245 that multiples the demodulated spread spectrum signal with the scrambling codes furnished by a scrambling code generator 250. This multiplication may despread and/or descramble the demodulated spread spectrum signal, restoring the RF communication signal 215. The receiver 205 may comprise a decoder 255 that extracts the original data from the receiver 205.

Figure 3:
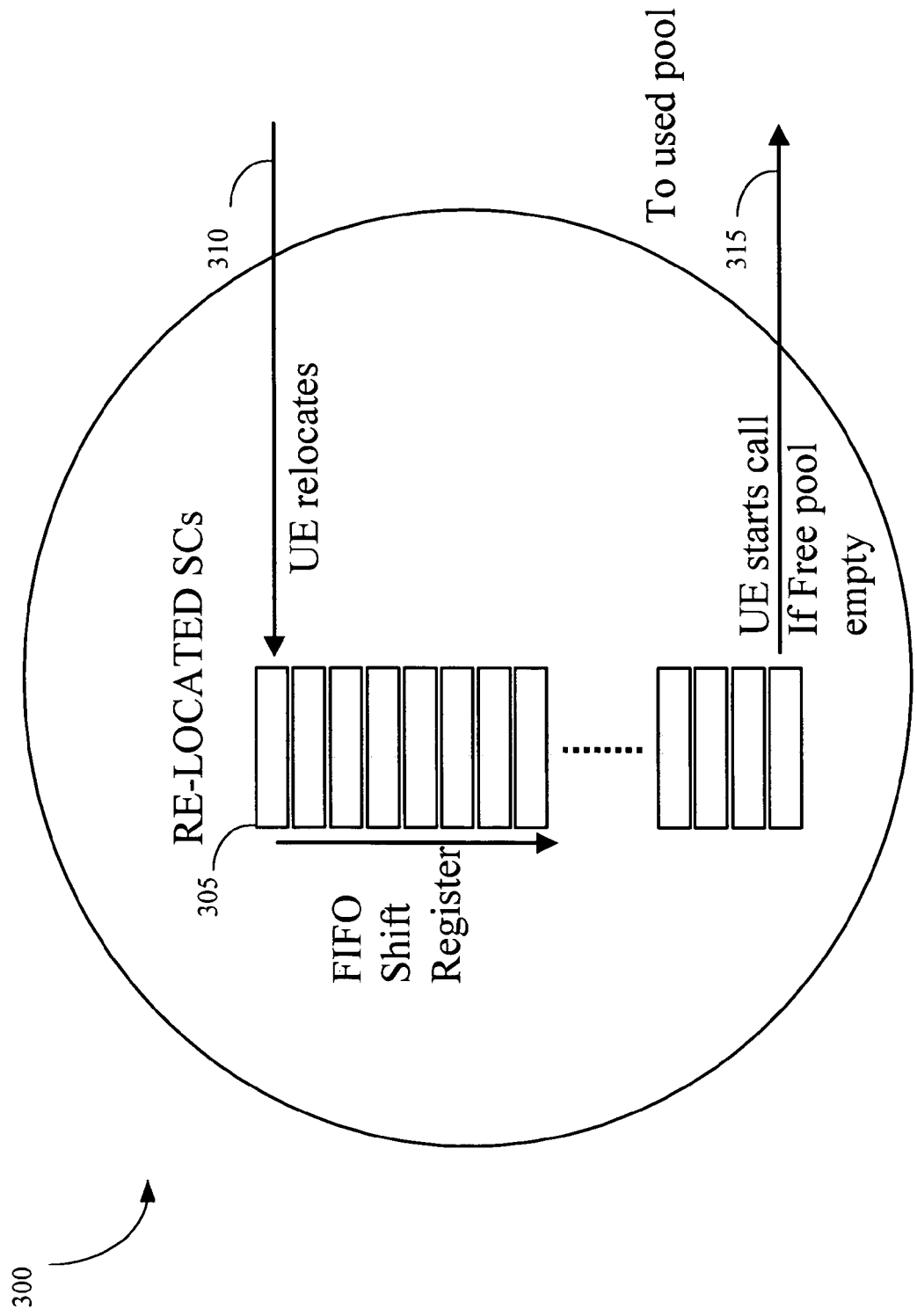
FIG. 3 schematically depicts a first-in-first-out shift register as the buffer shown in FIG. 1 consistent with one embodiment of the present invention.

Consistent with one embodiment of the present invention, a first-in-first-out (FIFO) shift register 300 is schematically depicted in FIG. 3 as the first buffer 122(1) shown in FIG. 1. As illustrated in FIG. 3, the FIFO shift register 300 may comprise a multiplicity of registers 305 to receive re-located scrambling codes in an indication arrow 310, when the UE 110 relocates from the first RNC 105(1) to the second RNC 105(N). When the UE 110 initiates a call, and if a pool of free or available scrambling codes is empty, the removed scrambling code may be sent to a pool of used scrambling codes, as illustrated by an indication arrow 315. The role of different pools of the scrambling codes, as controlled by the first manager 124(1) is described below.

Figure 4:
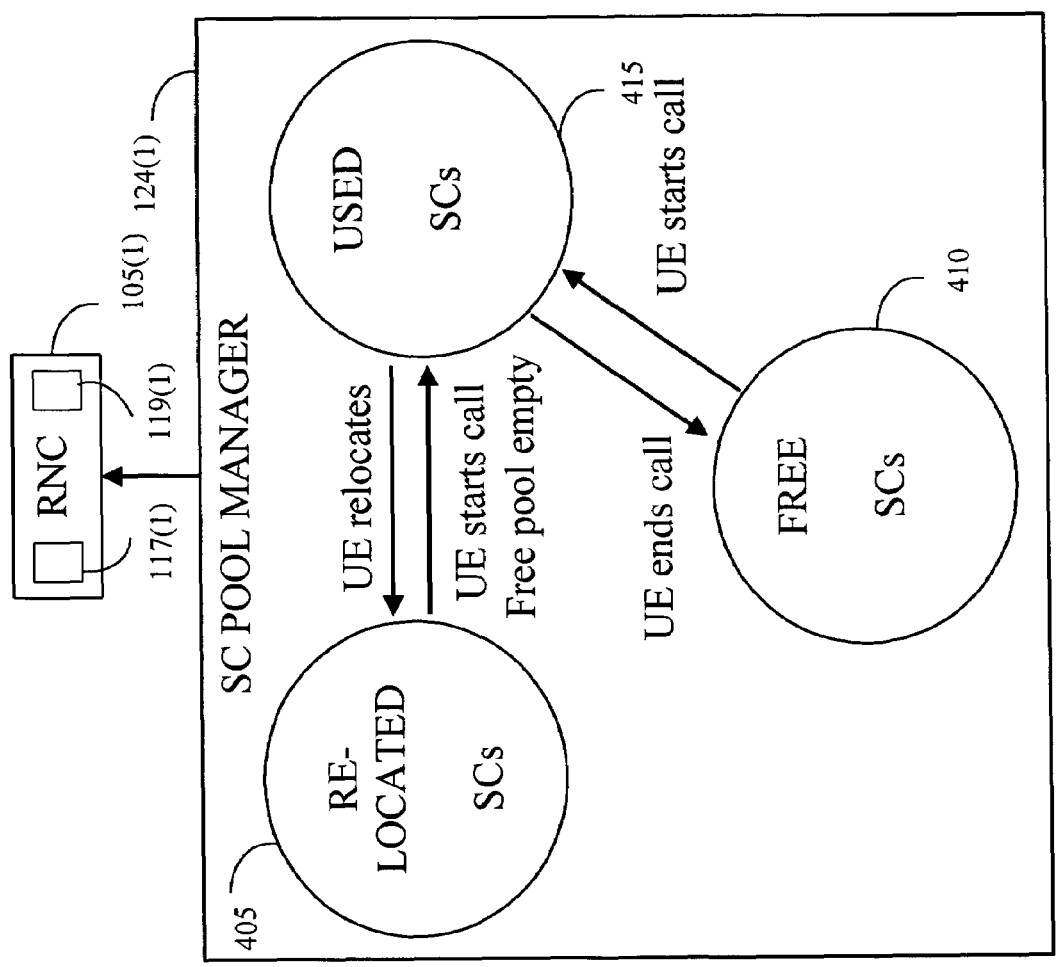
FIG. 4 schematically depicts one embodiment of the manager shown in FIG. 1 to manage a first pool of one or more relocated scrambling codes, a second pool of one or more free scrambling codes, and a third pool of one or more used scrambling codes at the first and second radio network controllers.

As depicted, FIG. 4 schematically illustrates one embodiment of the first manager 124(1) shown in FIG. 1 to manage a first pool 405 of one or more relocated scrambling codes, a second pool 410 of one or more free scrambling codes, and a third pool 415 of one or more used scrambling codes at the first radio network controller 105(1). The first manager 124(1) transitions at least one scrambling code from the first pool 405 of the relocated scrambling codes to the second pool 410 of the free scrambling codes through the third pool 415 of the used scrambling codes. Based on a desired handling of a particular scrambling code by the first radio network controller 105(1), in one embodiment, the first manager 124(1) reassigns that scrambling code on the second radio network controller 105(N) from the one or more scrambling codes available at the first radio network controller 105(1).

The first manager 124(1) may move a first scrambling code associated with the user equipment 110 into the first pool 405 of the relocated scrambling codes, and in response to moving of the first scrambling code, a respective oldest scrambling code may be moved out from the FIFO shift register 300. A determination may be made as to whether or not the second pool 410 of the free scrambling codes is empty. If determined to be empty, a second scrambling code may be removed from the first pool 405 of the relocated scrambling codes. The second scrambling code may be assigned to the user equipment 110 from the first pool 405 of the relocated scrambling codes. In response to a user starting a call at the user equipment 110, the first manager 124(1) may transit the second scrambling code to the third pool 415 of the used scrambling codes. A desired assignment of the first and second scrambling codes may be obtained within each of the first and second radio network controllers 105(1-N) among the one or more scrambling codes, i.e., the total set of scrambling codes. In this manner, scrambling code administration may be performed during the serving radio network subsystem relocation without using additional signaling between the first and second radio network controllers 105(1-N).

Figure 5:
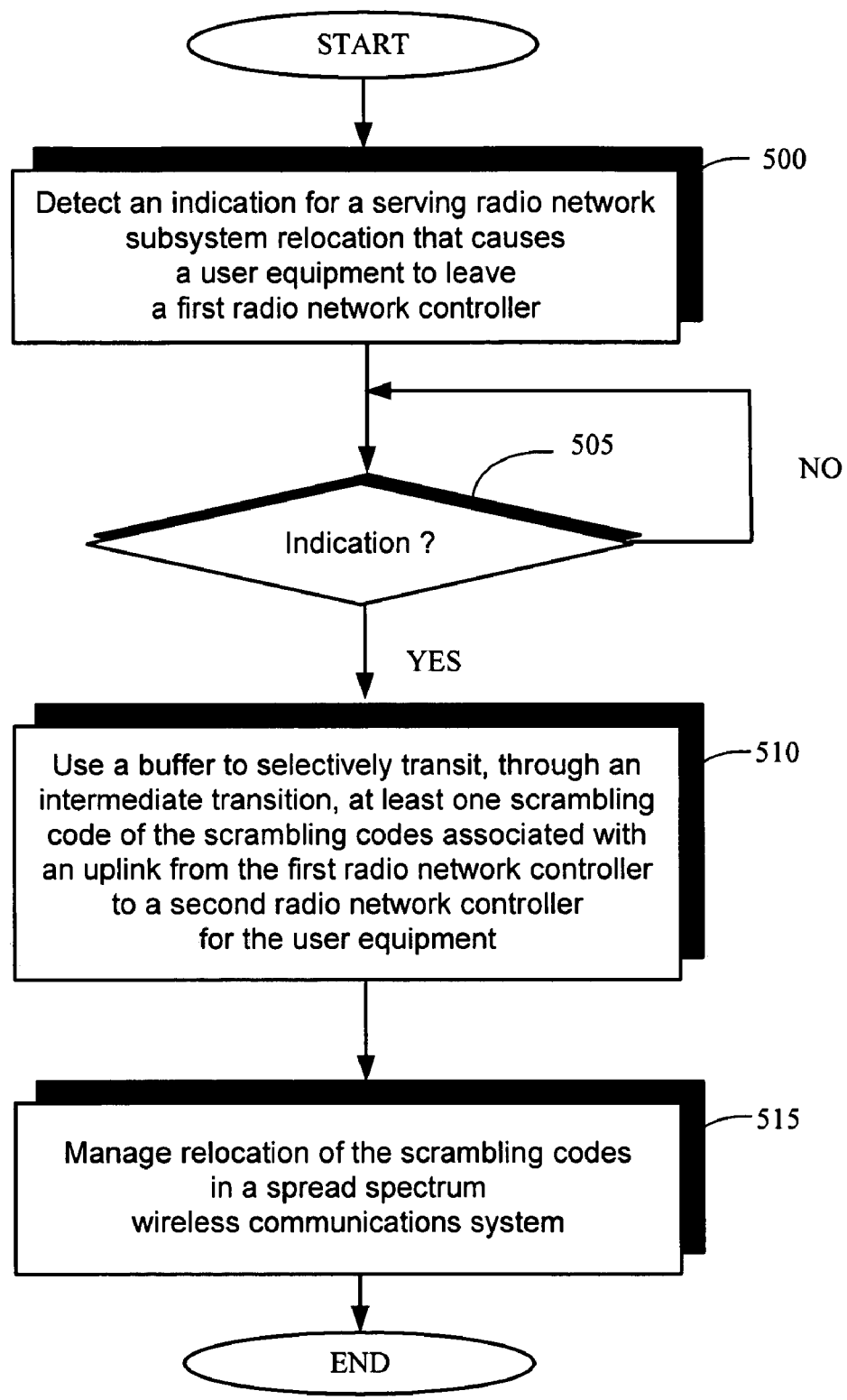
FIG. 5 shows a stylized representation of a method for managing relocation of one or more scrambling codes in the spread spectrum wireless communications system shown in FIG. 1 at each of the first and second radio network controllers according to one illustrative embodiment of the present invention.

A stylized representation of a method is shown in FIG. 5 for the first manager 124(1) to manage relocation of one or more scrambling codes in the spread spectrum wireless communications system 100 shown in FIG. 1 at each of the first and second radio network controllers 105(1-N) according to one illustrative embodiment of the present invention. At block 500, an indication may be detected for a serving radio network subsystem relocation that causes the user equipment 110 to leave the first radio network controller 105(1). A check at a decision block 505 may ascertain whether or not the indication causing relocation is available.

If so, at block 510, using the first buffer 122(1) may selectively transit, through an intermediate transition, at least one scrambling code of the one or more scrambling codes associated with an uplink from the first radio network controller 105(1) to the second radio network controller 105(N) for the user equipment 110. In this way, using the FIFO register 400, the first manager 124(1) may manage relocation of one or more scrambling codes in the spread spectrum wireless communications system 100.

In some embodiments, a network vendor may deploy the first manager 124(1) to implement an assignment scheme of scrambling codes, which have been relocated to from one RNC to other RNCs, where early reuse may cause collisions. The first manager 124(1) may account for a case where the UE 110 takes a scrambling code to another RNC by the SRNS relocation. The first RNC 105(1) may maintain three pools of scrambling codes, namely the first pool 405 of one or more relocated scrambling codes (SCs), the second pool 410 of one or more free scrambling codes and the third pool 415 for each of one or more used scrambling codes. The handling of a SC transition between the used and free SCs pool is set forth below.

The UE 110, upon a request may be assigned a SC from the second pool 410 of one or more free scrambling codes and that particular SC may be moved to the third pool 415 for each of one or more used scrambling codes. If a call terminates, be it because of a regular call termination or a failure, the SC goes back to the second pool 410 of one or more free scrambling codes. If the UE 110 has relocated from a different RNC and has thus brought along a SC that was not originally assigned to the current RNC then the RNC may discard the SC upon the call termination.

When the UE 110 leaves the first RNC 105(1) due to SRNS relocation, as described above, the associated SC may be moved to the first pool 405 of one or more relocated scrambling codes, i.e., the first manager 124(1) may cause transiting of the SCs from the first pool 405 of one or more relocated scrambling codes to either one of the third pool 415 for each of one or more used scrambling codes or the second pool 410 of one or more free scrambling codes.

However, if the UE 110 initiates a call such that no scrambling codes may be available from the second pool 410 of one or more free scrambling codes, a scrambling code from the first pool 405 of one or more relocated scrambling codes may not be assigned at a cost of a higher risk of collision. By using the first manager 124(1) to transit SCs from the first pool 405 of one or more relocated scrambling codes, a risk of collision, which depends upon a total number of SCs available at an RNC, i.e., the total sizes of the three pools, between UEs that may end up using the same scrambling code may be obviated because there is no direct transition between the pool 405 of one or more relocated scrambling codes and the third pool 415 of free scrambling codes, as it is illustrated in FIG. 4.

In this way, an uplink (UL) scrambling code may be assigned to a particular UE. The scrambling code may be taken from the third pool 415 of free scrambling codes if this pool is not empty. If the third pool 415 of free scrambling codes is empty, an UL SC from a FIFO queue of the relocated UL SC pool may be taken. In both cases, however, a particular SC may be moved to the third pool 415 of the used scrambling codes. If a scrambling code from the SRNCs in the third pool 415 of the used scrambling codes becomes free, a call-teardown may be under way, causing a call to be dropped or this scenario may happen due to other reasons. Thus, the SC may be moved to the second pool 410 of the free scrambling codes and may be immediately reused if desired.

If the UE 110 moves into a DRNC area and if the Iu connection is relocated by a SRNS relocation procedure, the source RNC (old serving RNC 105(1)) may store the UL SC in the first pool 405 of the relocated UL SCs. This may avoid an early reuse, because the target RNC 105(N) (new serving RNC) may use the same SC as long the relocated UE 110 maintains the current call. The target RNC may never use this UL scrambling code for its own UL scrambling code assignments. When the UE 100 relocates from a different RNC and has thus brings along a SC that was not originally assigned to the current RNC, and then the first RNC 105(1) may discard the SC upon the call termination for administration of the SCs.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium. The program storage medium may be magnetic (e.g., a floppy disk or a hard drive) or optical (e.g., a compact disk read only memory, or "CD ROM"), and may be read only or random access. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of managing relocation of one or more scrambling codes in a spread spectrum wireless communications system, the method comprising:

detecting an indication for a serving radio network subsystem relocation that causes a user equipment to leave a first radio network controller;
in response to said indication, selectively transiting, through an intermediate transition, said at least one scrambling code of said one or more scrambling codes associated with an uplink from said first radio network controller to a second radio network controller for said user equipment;
transitioning said at least one scrambling code from a first pool of one or more relocated scrambling codes to a second pool of one or more free scrambling codes through a third pool of one or more used scrambling codes at said first radio network controller;
moving a first scrambling code associated with said user equipment into said first pool of one or more relocated scrambling codes; and
in response to moving said first scrambling code, moving out a respective oldest scrambling code from said first-in-first-out shift register;
determining whether said second pool of one or more free scrambling codes is empty; and
if empty, removing a second scrambling code from said first pool of one or more relocated scrambling codes.

2. A method, as set forth in claim 1, wherein selectively transiting, through an intermediate transition, at least one scrambling code further comprises:
reassigning said at least one scrambling code on said second radio network controller from said one or more scrambling codes at said first radio network controller based on a desired handling of said at least one scrambling code by said first radio network controller.

3. A method, as set forth in claim 1, wherein selectively transiting, through an intermediate transition, at least one scrambling code further comprises using the first-in-first-out shift register.

4. A method, as set forth in claim 1, further comprising:
assigning said second scrambling code to said user equipment from said first pool of one or more relocated scrambling codes.

5. A method, as set forth in claim 4, wherein assigning said second scrambling code further comprising:
in response to a user starting a call at said user equipment, transiting said second scrambling code to said third pool of one or more used scrambling codes.

6. A method, as set forth in claim 4, further comprising:
obtaining a desired assignment of said first and second scrambling codes within each of said first and second radio network controllers among said one or more scrambling codes.

7. A method, as set forth in claim 1, further comprising:
performing scrambling code administration during said serving radio network subsystem relocation without using additional signaling between said first and second radio network controllers.

8. A radio network controller associated with a wireless network in a spread spectrum wireless communications system, said radio network controller comprising:
a controller; and a storage coupled to said controller, said storage instructions to detect an indication for a serving radio network subsystem relocation that causes a user equipment to leave a first radio network controller;
in response to said indication, selectively transit, through an intermediate transition, said at least one scrambling code of said one or more scrambling codes associated with an uplink to a second radio network controller for said user equipment;
transition said at least one scrambling code from a first pool of one or more relocated scrambling codes to a second pool of one or more free scrambling codes through a third pool of one or more used scrambling codes;
move a first scrambling code associated with said user equipment into said first pool of one or more relocated scrambling codes;
in response to moving said first scrambling code, move out a respective oldest scrambling code from a first-in-first-out shift register;
determine whether said second pool of one or more free scrambling codes is empty; and
if empty, remove a second scrambling code from said first pool of one or more relocated scrambling codes.

9. A radio network controller, as set forth in claim 8, wherein said radio network controller further comprises a buffer to manage a first pool of one or more relocated scrambling codes, a second pool of one or more free scrambling codes, and a third pool of one or more used scrambling codes at said radio network controller.

10. A radio network controller, as set forth in claim 8, wherein said radio network controller is coupled to a base station that communicates with said user equipment.

11. A radio network controller, as set forth in claim 8, wherein said radio network controller further comprises:
a manager; and
a first-in-first-out shift register that said manager uses to manage a first pool of one or more relocated scrambling codes, a second pool of one or more free scrambling codes, and a third pool of one or more used scrambling codes at said radio network controller.

12. A radio network controller, as set forth in claim 8, wherein said wireless network is being defined at least in part by a code division multiple access protocol.

13. A spread spectrum wireless communications system comprising:
a radio network controller associated with a wireless network, said radio network controller including;
a controller, and
a storage coupled to said controller, said storage storing instructions to detect an indication for a serving radio network subsystem relocation that causes a user equipment to leave said radio network controller and to use a buffer to selectively transit, through an intermediate transition, at least one scrambling code of said one or more scrambling codes associated with an uplink from said radio network controller to a second radio network controller for said user equipment in response to said indication;
transition said at least one scrambling code from a first pool of one or more relocated scrambling codes to a second pool of one or more free scrambling codes through a third pool of one or more used scrambling codes;
move a first scrambling code associated with said user equipment into said first pool of one or more relocated scrambling codes;
in response to moving said first scrambling code, move out a respective oldest scrambling code from a first-in-first-out shift register;
determine whether said second pool of one or more free scrambling codes is empty; and
if empty remove a second scrambling code from said first pool of one or more relocated scrambling codes.

14. A spread spectrum wireless communications system, as set forth in claim 13, wherein said wireless network comprises an access network and a core network, said wireless network is being defined at least in part by a code division multiple access protocol.

15. A spread spectrum wireless communications system, as set forth in claim 13, wherein said radio network controller further comprises:
a manager that uses said first-in-first-out shift register to manage a first pool of one or more relocated scrambling codes, a second pool of one or more free scrambling codes, and a third pool of one or more used scrambling codes at said radio network controller.

16. An article comprising a computer readable storage medium storing instructions that, when executed cause a spread spectrum wireless communications system to;
detect an indication for a serving radio network subsystem relocation that causes a user equipment to leave a first radio network controller; and
selectively transit, through an intermediate transition, at least one scrambling code of said one or more scrambling codes associated with an uplink from said first radio network controller to a second radio network controller for said user equipment in response to said indication;
transition said at least one scrambling code from a first pool of one or more relocated scrambling codes to a second pool of one or more free scrambling codes through a third pool of one or more used scrambling codes;
move a first scrambling code associated with said user equipment into said first pool of one or more relocated scrambling codes;
in response to moving said first scrambling code, move out a respective oldest scrambling code from a first-in-first-out shift register;
determine whether said second pool of one or more free scrambling codes is empty; and
if empty. remove a second scrambling code from said first pool of one or more relocated scrambling codes.

17. An apparatus for managing relocation of one or more scrambling codes in a spread spectrum wireless communications system, the apparatus comprising:
means for detecting an indication for a serving radio network subsystem relocation that causes a user equipment to leave a first radio network controller;
means for selectively transiting, in response to said indication, through an intermediate transition, said at least one scrambling code of said one or more scrambling codes associated with an uplink from said first radio network controller to a second radio network controller for said user equipment;
means for transitioning said at least one scrambling code from a first pool of one or more relocated scrambling codes to a second pool of one or more free scrambling codes through a third pool of one or more used scrambling codes;
means for moving a first scrambling code associated with said user equipment into said first pool of one or more relocated scrambling codes;
means for moving out a respective oldest scrambling code from a first-in-first-out shift register, in response to moving said first scrambling code;
means for determining whether said second pool of one or more free scrambling codes is empty; and
if empty. means for removing a second scrambling code from said first pool of one or more relocated scrambling codes.

* * * * *